United States Patent
Park et al.

(10) Patent No.: US 7,746,890 B2
(45) Date of Patent: Jun. 29, 2010

(54) INTERFACE DEVICE AND INTER-CHIP COMMUNICATION INTERFACE APPARATUS TO CONTROL DATA TRANSFER BETWEEN CHIPS

(75) Inventors: Jin-Kwon Park, Suwon-si (KR); Cheon-Su Lee, Seoul (KR); Jae-Shin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 11/970,019

(22) Filed: Jan. 7, 2008

(65) Prior Publication Data

US 2008/0212580 A1 Sep. 4, 2008

(30) Foreign Application Priority Data

Jan. 17, 2007 (KR) ...................... 10-2007-0005018

(51) Int. Cl.
*H04J 3/00* (2006.01)
(52) U.S. Cl. ...................... 370/463; 370/389
(58) Field of Classification Search ........................ None
See application file for complete search history.

(56) References Cited

U.S. PATENT DOCUMENTS

| 4,667,337 A * | 5/1987 | Fletcher ........................ 377/41 |
| 6,243,779 B1 * | 6/2001 | Devanney et al. ............ 710/305 |
| 6,584,572 B1 * | 6/2003 | Choi ........................... 713/320 |
| 2003/0072286 A1 | 4/2003 | Kim et al. |
| 2004/0205447 A1 * | 10/2004 | Park et al. ................... 714/823 |
| 2005/0105494 A1 | 5/2005 | Kim et al. |
| 2008/0162778 A1 * | 7/2008 | Choi et al. .................. 711/100 |

FOREIGN PATENT DOCUMENTS

JP 8-321832 12/1996
KR 1020040012677 11/2004

* cited by examiner

*Primary Examiner*—Huy D Vu
*Assistant Examiner*—Benjamin Lamont
(74) *Attorney, Agent, or Firm*—Stanzione & Kim, LLP

(57) ABSTRACT

An interface device transforms data to a packet and inverts at least a portion of the packet to reduce a number of bit toggles at corresponding locations in a previous packet. A reverse bit appended to the packet indicates whether the packet is inverted. A transmission packet including the reverse bit and the portion of the packet inverted according to a state of the reverse bit is transmitted, and the data are recovered from a received packet, the portion of which that was inverted is inverted again according to the state of the reverse bit.

9 Claims, 9 Drawing Sheets

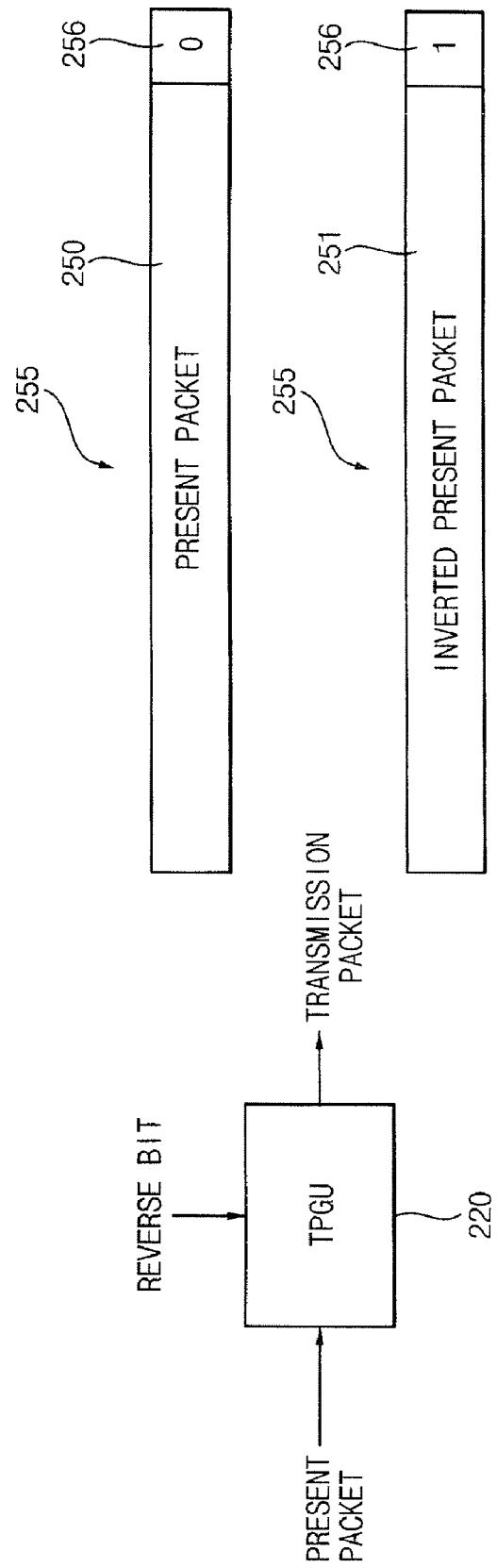

INTERFACE DEVICE AND INTER-CHIP COMMUNICATION INTERFACE APPARATUS TO CONTROL DATA TRANSFER BETWEEN CHIPS

CROSS-REFERENCE TO RELATED APPLICATIONS

This application claims priority under 35 USC §119 to Korean Patent Application No. 2007-0005018, filed on Jan. 17, 2007 in the Korean Intellectual Property Office (KIPO), the disclosure of which is incorporated herein in its entirety by reference.

BACKGROUND OF THE INVENTION

1. Field of the Invention

The present general inventive concept relates to an interface device, and more particularly to an interface device to control data transfer between chips.

2. Description of the Related Art

Recently, system-on-chips have been employed in various portable devices. In the portable devices, a scheme to reduce power consumption is preferably implemented so that the operating time of the portable devices can be extended. When the interface device employs complementary metal oxide semiconductor (CMOS), the interface device conducts current in response to bit state toggling of the outputs. Therefore, reducing a bit toggle rate can decrease the amount of power consumed at the CMOS outputs.

The toggle rate is determined as the rate at which each value of the present data and the previous data changes state. When data are transmitted without being processed, the toggle rate is not controlled. In the worst case, where each bit of the present data is in a different state as the same bit in the previous data, the toggle rate is substantially 100% and consequently, a large amount of power is consumed.

Accordingly, there is a need to provide a device to reduce the toggle rate, and thereby, to reduce the power consumption of the interface device.

SUMMARY OF THE INVENTION

Accordingly, the present general inventive concept substantially overcomes one or more problems in the related art that are present due to limitations and disadvantages thereof.

The present general inventive concept provides an interface device capable of reducing power consumption by controlling a bit toggle rate. The general inventive concept may be implemented in interface devices of varying transmission rates, in varying communication packet formats, and in varying package forms.

Additional aspects and utilities of the present general inventive concept will be set forth in part in the description which follows and, in part, will be obvious from the description, or may be learned by practice of the general inventive concept.

The foregoing and/or additional aspects and utilities of the present general inventive concept may be achieved by providing an interface device that includes a packet generation unit (PGU), a reverse bit generation unit (RBGU), a transmission packet generation unit (TPGU), a packet recovery unit (PRU) and a data recovery unit (DRU). The RBGU transforms data that are to be transmitted from a first chip to a second chip into a present packet. The RBGU provides a reverse bit to indicate whether the present packet is inverted, based on a toggle number of state changes at each corresponding bit position of the present packet and a previous packet. The previous packet corresponds to a packet that is transmitted prior to the present packet. The TPGU receives the present packet and the reverse bit to provide a transmission packet including the reverse bit and one of the present packet and an inverted present packet. The PRU recovers the present packet from the transmission packet, based on the reverse bit. The DRU recovers the data from the present packet.

The RBGU may include a register, a first bit toggle checker unit (BTCU), a second BTCU, and a comparator. The register may store the previous packet. The first BTCU may count a first toggle number of state changes at each corresponding bit position of the present packet and the previous packet. The second BTCU may count a second toggle number of state changes at each corresponding bit position of the inverted present packet and the previous packet. The comparator may compare a first output of the first BTCU and a second output of the second BTCU to provide the reverse bit. The RBGU may further include a bit reverse unit (BRU) that inverts each bit of the present packet.

The TPGU may provide the transmission packet including the reverse bit and the inverted present packet when the reverse bit indicates that the first output is equal to or greater than the second output. The PRU may remove the reverse bit from the transmission packet, invert the inverted present packet, and provide the present packet to the DRU when the reverse bit indicates that the first output is equal to or greater than the second output.

The TPGU may provide the transmission packet including the reverse bit and the present packet when the reverse bit indicates that the first output is smaller than the second output. The PRU may remove the reverse bit from the transmission packet, and provide the present packet to the DRU when the reverse bit indicates that the first output is smaller than the second output.

The foregoing and/or additional aspects and utilities of the present general inventive concept may also be achieved by providing an interface device that includes a PGU, a RBGU, a TPGU, a PRU and a DRU. The PGU transforms data to a present upper packet and a present lower packet and simultaneously provides the present upper packet and the present lower packet during one clock cycle, and the data are to be transmitted from a first chip to a second chip. The RBGU provides a reverse bit indicating whether the present lower packet is inverted, based on a toggle number of state changes at each corresponding bit position of the present upper packet, the present lower packet and a previous upper packet. The previous upper packet corresponds to a packet that is transmitted prior to the present upper packet and the present lower packet. The TPGU receives the present upper packet, the present lower packet and the reverse bit to provide a transmission packet including the reverse bit, the present upper packet and one of the present lower packet and an inverted present lower packet. The PRU recovers the present upper packet and the present lower packet from the transmission packet, based on the reverse bit. The DRU recovers the data from the present upper packet and the present lower packet.

The RBGU may include a register, a first BTCU, a second BTCU, and a comparator. The register may store the previous upper packet. The BTCU may count a first toggle number of state changes at each corresponding bit position of the previous upper packet, the present lower packet and the present upper packet. The second BTCU may count a second toggle number of state changes at each corresponding bit position of the previous upper packet, an inverted present lower packet and the present upper packet. The comparator may compare a first output of the first BTCU and a second output of the second BTCU to provide the reverse bit. The interface device may further include a BRU that inverts each bit of the present lower packet.

The TPGU may provide the transmission packet including the reverse bit, the present upper packet, and the inverted present lower packet during one clock cycle when the reverse bit indicates that the first output is equal to or greater than the second output. The reverse bit may be appended to a last bit of the inverted present lower packet, and an extra bit may be appended to a last bit of the present upper packet. The PRU may remove the reverse bit and the extra bit from the transmission packet, invert the inverted present lower packet, and provide the present upper packet and the present lower packet to the DRU when the reverse bit indicates that the first output is equal to or greater than the second output.

The TPGU may provide the transmission packet including the reverse bit, the present upper packet, and the present lower packet during one clock cycle when the reverse bit indicates that the first output is smaller than the second output. The reverse bit may be appended to a last bit of the present lower packet, and an extra bit may be appended to a last bit of the present upper packet. The PRU may remove the reverse bit and the extra bit from the transmission packet, and provide the present upper packet and the present lower packet to the DRU when the reverse bit indicates that the first output is smaller than the second output.

The foregoing and/or additional aspects and utilities of the present general inventive concept may also be achieved by providing a method of interfacing that includes transforming data to be transmitted from a first chip to a second chip into a present upper packet and a previous lower packet to simultaneously provide the present upper packet and the previous lower packet during one clock cycle, providing a reverse bit to indicate whether the present lower packet is inverted, based on a toggle number of state changes at each corresponding bit position of the present upper packet, the present lower packet and a previous upper packet, receiving the present upper packet, the present lower packet and the reverse bit to provide a transmission packet including the reverse bit, recovering the present upper packet and the present lower packet from the transmission packet based on the reverse bit, and recovering the data from the present upper packet and the present lower packet. The previous upper packet corresponds to a packet that is transmitted prior to the present upper packet and the present lower packet. The transmission packet includes one of the present lower packet and the inverted present lower packet.

The foregoing and/or additional aspects and utilities of the present general inventive concept may also be achieved by providing a system-in-package (SIP) that includes a package substrate, a first chip and a second chip mounted on the package substrate and a second chip that exchanges data with the first chip. The first chip includes a PGU, a RBGU, and a TPGU. The PGU transforms data to a present upper packet and a present lower packet and simultaneously provides the present upper packet and a present lower packet during one clock cycle, and the data are transmitted from the first chip to the second chip. The RGBU provides a reverse bit to indicate whether the present lower packet is inverted, based on a toggle number of state changes at each corresponding bit position of the present upper packet, the present lower packet and a previous upper packet, and the previous upper packet corresponds to a packet that is transmitted prior to the present upper packet and the present lower packet. The TPGU receives the present upper packet, the present lower packet and the reverse bit to provide a transmission packet including the reverse bit, and the transmission packet is determined as to whether the present lower packet is inverted. The second chip includes a PRU and a DRU. The PRU recovers the present upper packet and the present lower packet from the transmission packet, based on the reverse bit. The DRU recovers the data from the present upper packet and the present lower packet.

The foregoing and/or other aspects and utilities of the present general inventive concept may also be achieved by providing a method of inter-chip communications. The method includes determining whether a number of state changes at predetermined bit positions of a packet and a previously transmitted packet is reduced by inverting at least a portion of the packet, and appending a reverse bit to the packet to indicate whether the portion thereof is inverted. The method includes transmitting the packet with the portion thereof inverted or non-inverted according to a state of the reverse bit, the packet thereby established as the previously transmitted packet of a subsequent determination of whether the number of state changes is reduced by the inverting.

The foregoing and/or other aspects and utilities of the present general inventive concept may also be achieved by providing an inter-chip communication interface apparatus. A bit checker is provided to determine whether a number of state changes at predetermined bit positions of a packet and a previously transmitted packet is reduced by inverting at least a portion of the packet and to append a reverse bit to the packet in a state to indicate whether the portion thereof is inverted. A transmission unit is provided to transmit the packet with the portion thereof inverted or non-inverted according to the state of the reverse bit.

Therefore, power consumption is reduced by controlling the toggle rate of data transmission between chips in accordance with the present general inventive concept.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIG. 5 illustrates exemplary operation of a transmission packet generation unit (TPGU) the SRI device.

DETAILED DESCRIPTION OF THE PREFERRED EMBODIMENTS

Figure 1:
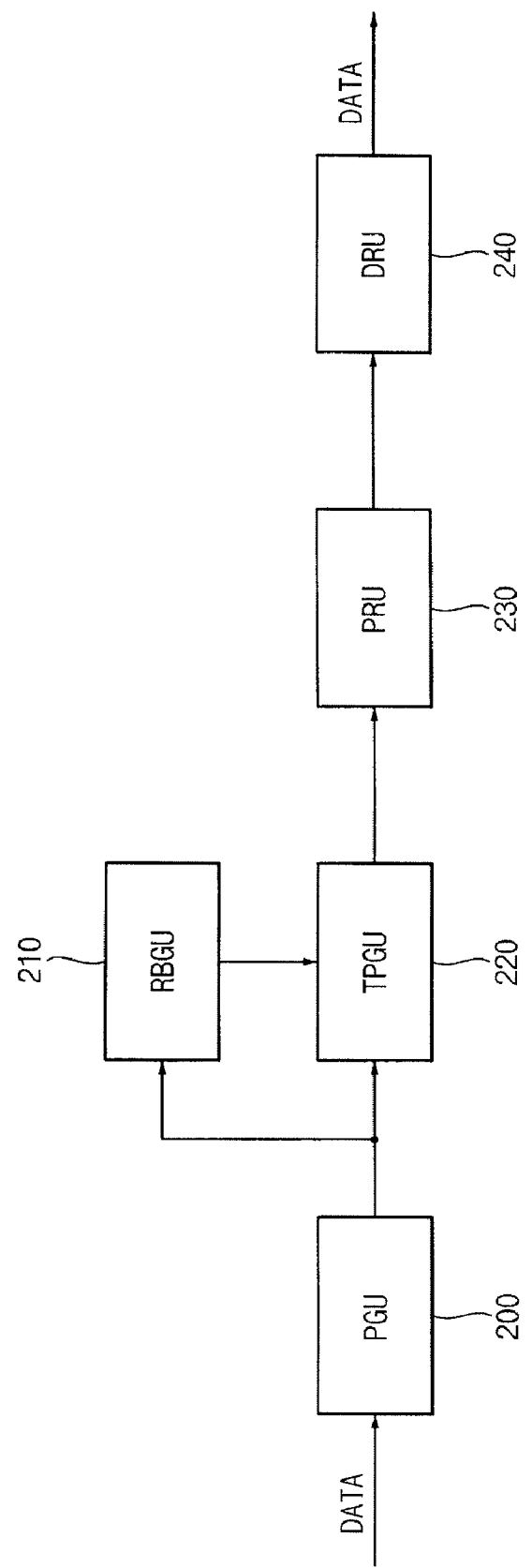
FIG. 1 is a block diagram illustrating an interface device according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

It is to be understood that, although the terms "first," "second," etc. may be used herein to indicate various elements, characteristics or structure of these elements should not be limited by these terms. These terms are used to distinguish one element from another, and are not intended to imply an ordering of elements. Additionally, as used herein, the term "and/or" includes any and all combinations of one or more of the associated listed items.

The terminology used herein is for the purpose of describing particular embodiments and is not intended to limit the present general inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It is to be further understood that terms, such as those defined in commonly used dictionaries, should be interpreted as having a meaning that is consistent with their meaning in the context of the relevant art and will not be used herein in an idealized or overly formal sense unless expressly so indicated.

FIG. 1 is a block diagram illustrating an interface device according to an exemplary embodiment of the present general inventive concept.

Referring to FIG. 1, the exemplary interface device includes a packet generation unit (PGU) 200, a reverse bit generation unit (RBGU) 210, a transmission packet generation unit (TPGU) 220, a packet recovery unit (PRU) 230, and a data recovery unit (DRU) 240.

Circuit components and architectures of the PGU 200, the RGBU 210, the TPGU 220, the PRU 230 and the DRU 240 may be adapted in their respective configurations to apply the present general inventive concept to both single rate interface (SRI) and dual rate interface (DRI) devices, as described in more detail below.

Hereinafter, an SRI device according to an exemplary embodiment of the present general inventive concept is described with reference to FIGS. 1, 2A, 3, 4A, 4B and 5.

The exemplary PGU 200 transforms data into a present packet, which is to be transmitted from a first chip to a second chip.

Figure 2A:
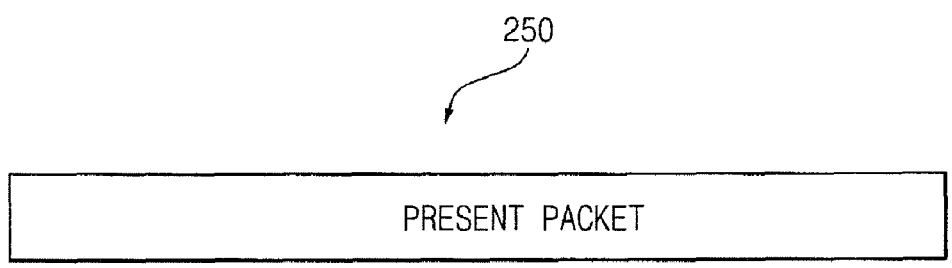
FIG. 2A illustrates a present packet provided from a packet generation unit (PGU) of an exemplary single rate interface (SRI) device.

FIG. 2A illustrates an exemplary present packet 250 provided from the PGU 200 of the SRI device. For purposes of description, the present packet 250 includes N-bit data, where each bit is located at a corresponding bit position in the packet.

Figure 3:
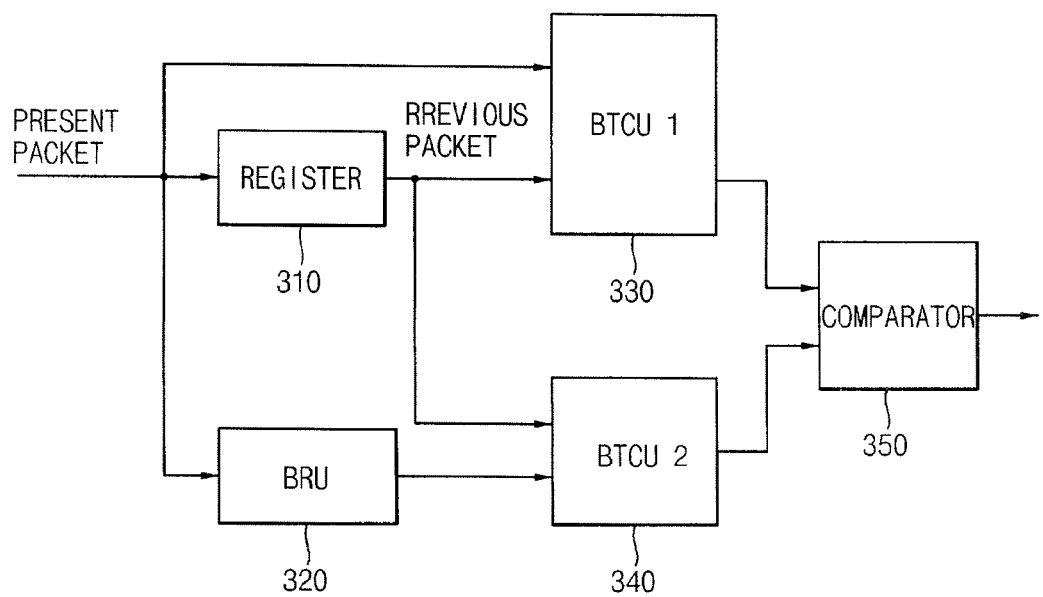
FIG. 3 is a block diagram illustrating exemplary architecture of a reverse bit generation unit (RBGU) of the SRI device.

FIG. 3 is a block diagram illustrating exemplary architecture of the RBGU 210 in the SRI device.

Referring to FIG. 3, the RBGU 210 includes a register 310, a bit reverse unit (BRU) 320, a first bit toggle checker unit (BTCU) 330, a second BTCU 340, and a comparator 350.

The exemplary register 310 stores a copy of a previous packet that is transmitted prior to the present packet. The first BTCU 330 counts a first toggle number of state changes, e.g. at transition from logic state "zero" to a logic state "one," and vice versa, at each corresponding bit position of the present packet with respect to the previous packet. That is, the state of a bit at a bit position in the present packet is compared with the state of the bit at the same bit position in the previous packet to determine whether the bit at that bit position toggles in its state from one packet to the next. The BRU 320 inverts each bit of the present packet and provides an inverted present packet to the second BTCU 340. The second BTCU 340 counts a second toggle number of state changes at each corresponding bit position of the inverted present packet with respect to the previous packet. The comparator 350 compares a first output from the first BTCU 330 and a second output from the second BTCU 340 to determine the state of a reverse bit, which indicates the packet configuration, e.g., inverted or non-inverted, that results in the fewer number of bit state toggles from the previous packet to the present packet.

Figure 4A:
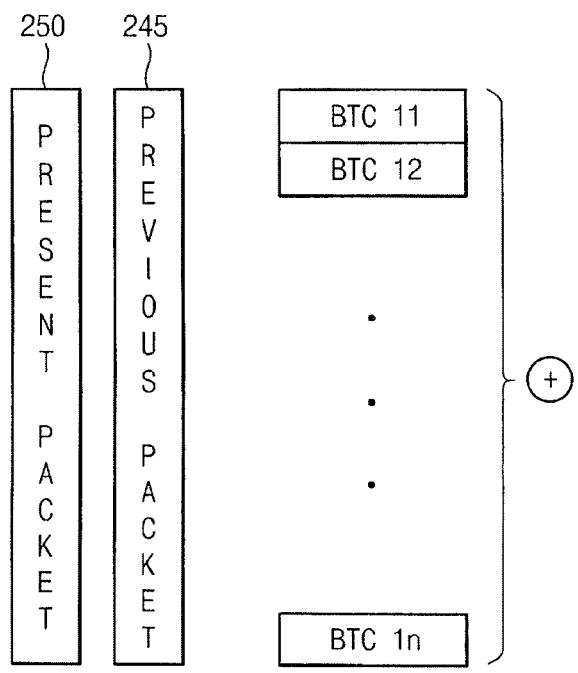
FIG. 4A illustrates exemplary operation of a first bit toggle checker unit (BTCU) of the SRI device.

FIG. 4A illustrates an operation of the first BTCU 330 of the SRI device.

Referring to FIG. 4A, the first BTCU 330 counts the first toggle number of toggling bits in the present packet 250 with respect to the previous packet 245 to provide the first output to the comparator 350. When each of the previous packet 245 and the present packet 250 includes N-bit data, the first BTCU 330 may include N bit toggle checkers (BTCs) (BTC11, ..., BTC1$n$). Each of the N BTCs (BTC11, ..., BTC1$n$) may output logic "one" when a toggle occurs in the corresponding bit, and may output logic "zero" when a toggle does not occur in the corresponding bit. The first BTCU 330 counts the number of logic "ones" from the N BTCs (BTC11, ..., BTC1$n$), and provides the number of logic "ones" as the first output to the comparator 350.

Figure 4B:
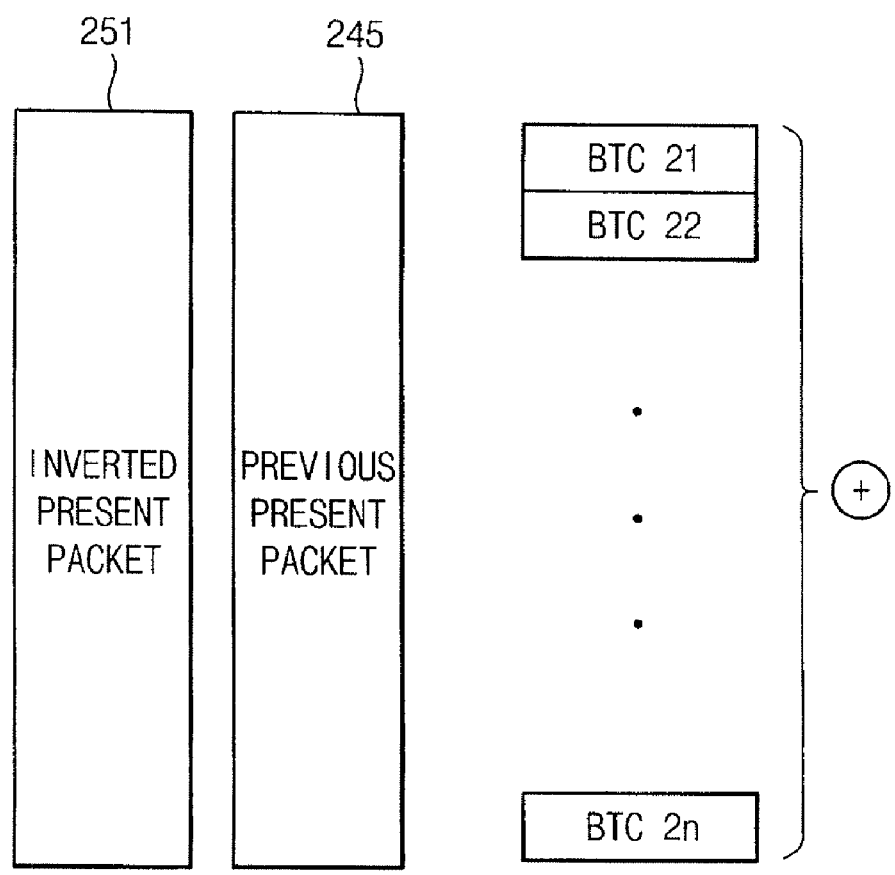
FIG. 4B illustrates exemplary operation of a second BTCU of the SRI device.

FIG. 4B illustrates an operation of the second BTCU 340 of the SRI device.

Referring to FIG. 4B, the second BTCU 340 counts the first toggle number of toggling bits in the inverted present packet 251 with respect to the previous packet 245 to provide the second output to the comparator 350. When each of the inverted previous packet 251 and the present packet 250 includes N-bit data, the second BTCU 340 may include N BTCs (BTC21, ..., BTC2$n$). Each of the N BTCs (BTC21, ..., BTC2$n$) may output logic "one" when a toggle occurs in the corresponding bit, and may output logic "zero" when a toggle does not occur in the corresponding bit. The second BTCU 340 counts the number of logic "ones" from the N BTCs (BTC21, ..., BTC2$n$), and provides the number of logic "ones" as the second output to the comparator 350.

The comparator 350 compares the first output from the first BTCU 330 and the second output from the second BTCU 340 to provide the state of the reverse bit. In certain embodiments of the present general inventive concept, when the first output is equal to or greater than the second output, the reverse bit may correspond to logic "one". When the first output is smaller than the second output, the reverse bit may correspond to logic "zero". Alternatively, when the first output is equal to or greater than the second output, the reverse bit may correspond to logic "zero," and when the first output is smaller than the second output, the reverse bit may correspond to logic "one".

That is, the comparator 350 provides the reverse bit to indicate whether the present packet is inverted, based on a toggle number of state changes at each corresponding bit position of the present packet 250 with respect to the previous packet 245.

The TPGU 220 receives the present packet and the reverse bit to provide a transmission packet including the reverse bit. The transmission packet may include the present packet or the inverted present packet and the corresponding reverse bit.

FIG. 5 illustrates an operation of the TPGU 220 the SRI device.

Referring to FIG. 5, the TPGU 220 receives the present packet from the PGU 200 and the reverse bit from the RBGU 210. When the reverse bit corresponds to logic "zero," the TPGU 220 provides a packet 255 including the present packet 250 and the reverse bit 256 corresponding to logic "zero" as the transmission packet. When the reverse bit corresponds to logic "one," the TPGU 220 provides a packet 255 including the inverted present packet 251 and the reverse bit 256 corresponding to logic "one" as the transmission packet. That is, the TPGU 220 provides a transmission packet having the smaller toggle number with respect to the previously transmitted packet as indicated by the state of the reverse bit 256. Therefore, power consumption may be reduced.

Referring back to FIG. 1, the PRU 230 recovers the present packet 250 from the transmission packet 255 according to the value of the reverse bit 256 included in the transmission packet 255. When the reverse bit 256 corresponds to logic "zero," the PRU 230 removes the reverse bit 256 from the transmission packet 255 and provides the present packet 250 to the DRU 240. When the reverse bit 256 corresponds to logic "one," PRU 230 removes the reverse bit 256 from the transmission packet 255 and provides the present packet 250 by inverting the inverted present packet 251 to the DRU 240. The DRU 240 recovers the data from the present packet 250.

The SRI device according to an exemplary embodiment of the present general inventive concept may control the toggle rate to be under 50% in the worst case, because one of the present packet and the inverted present packet is selected and transmitted when the data are transmitted from the first chip to the second chip.

Hereinafter, a DRI device and a method of dual rate interfacing according to an exemplary embodiment of the present general inventive concept are described with reference to FIGS. 1, 2B, 6, 7 and 8.

Referring back to FIG. 1, the PGU 200 in the exemplary DRI implementation of the present general inventive concept transforms data to a present upper packet and a present lower packet, and simultaneously provides the present upper packet and a present lower packet during one clock cycle. The present upper packet and the present lower packet are to be transmitted from a first chip to a second chip.

Figure 2B:
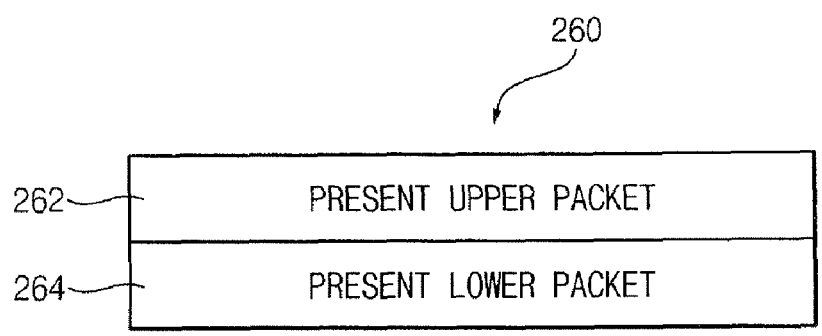
FIG. 2B illustrates a packet provided from a PGU of an exemplary dual rate interface (DRI) device.

FIG. 2B illustrates a packet 260 provided from the PGU 200 of the DRI device.

Referring to FIG. 2B, the exemplary packet 260 includes a present upper packet 262, and a present lower packet 264. When the packet 260 is compared with the present packet 250 in FIG. 2A, the packet 260 is segmented into two packets that are simultaneously transmitted, and thus a transmission rate may be doubled. For purposes of description and not limitation, each of the present upper packet 262 and the present lower packet 264 may include half of the N-bit data of the present packet 250 in FIG. 2A. The skilled artisan will recognize that the present general inventive concept can be extended to other segmentation and concurrent transmission schemes, which are limited by the transmission bandwidth of the inter-chip communication scheme and not by the implementation details of the present general inventive concept.

Figure 6:
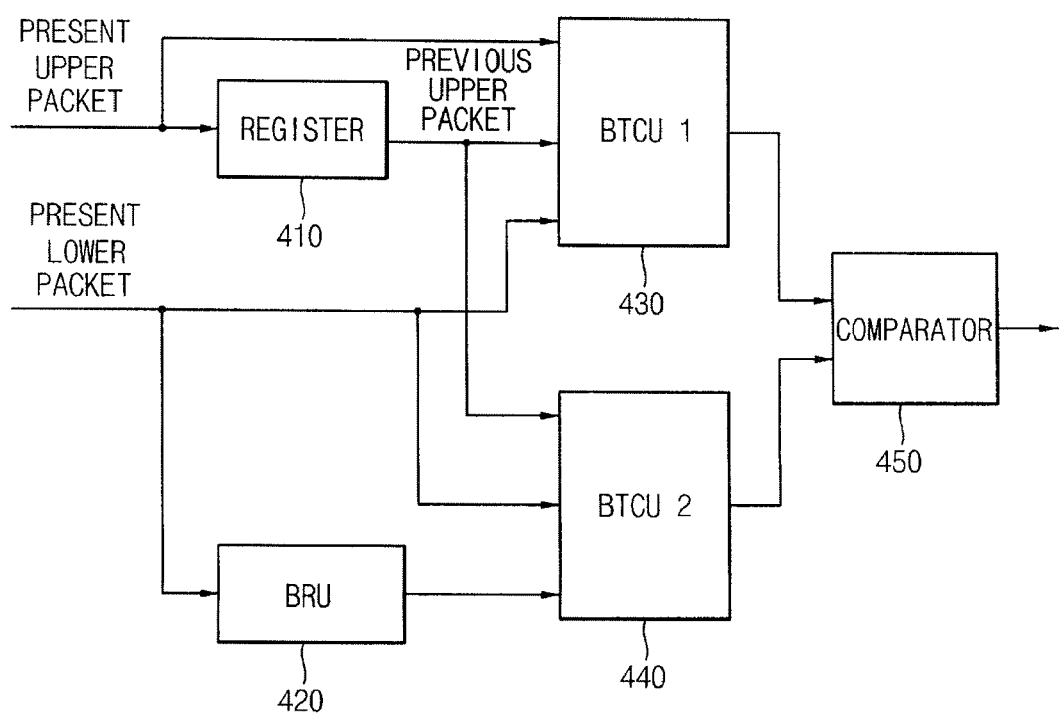
FIG. 6 is a block diagram illustrating exemplary architecture of the RGBU of the DRI device.

FIG. 6 is a block diagram illustrating exemplary architecture of the RGBU 210 of the DRI device.

Referring to FIG. 6, the exemplary RBGU 210 includes a register 410, a bit reverse unit (BRU) 420, a first bit toggle checker unit (BTCU) 430, a second BTCU 440, and a comparator 450.

The register 410 stores a copy of a previous upper packet and provides the previous upper packet to the first BTCU 430 and the second BTCU 440. The first BTCU 430 counts a first toggle number of state changes at each corresponding bit position of the previous upper packet, the present lower packet and the present upper packet. The BRU 420 inverts each bit of the present lower packet and provides an inverted present lower packet to the second BTCU 440. The second BTCU 440 counts a second toggle number of state changes at each corresponding bit position of the previous upper packet, the inverted present lower packet and the present upper packet. The comparator 450 compares a first output of the first BTCU 430 and a second output of the second BTCU 440 to provide the state of the reverse bit. It is to be understood that segment packets in addition to the upper and lower packet described above may be used with the present general inventive concept. In such implementations, predetermined segment packets may be evaluated, in which case a BRU 420 and corresponding BTCU 440 may be included for each evaluated segment packet, Other segment packets may not be evaluated, in which case no BRU 420, or reverse bit to indicate an inversion, are needed. The multiple segment implementations may be carried out in similar fashion to the upper/lower packet implementations described herein.

Figure 7A:
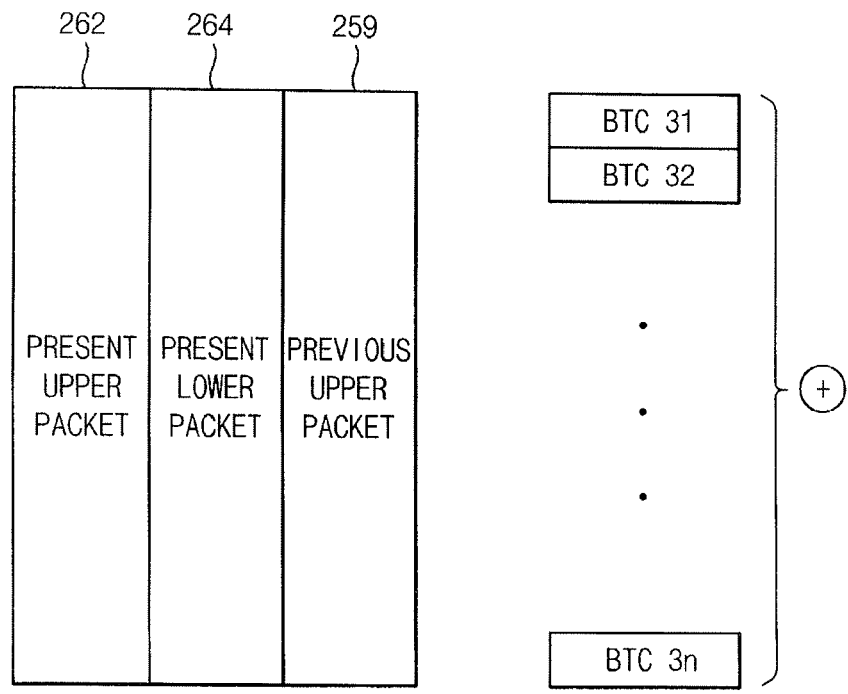
FIG. 7A illustrates exemplary operation of a first BTCU of the DRI device.

FIG. 7A illustrates an operation of the first BTCU 430 in case of the DRI device.

Referring to FIG. 7A, the first BTCU 430 counts the first toggle number of toggling bits in the previous upper packet 259, the present lower packet 264 and the present upper packet 262. When the data that are transmitted is, for example, 2N-bit data, each of the present upper packet 262 and the present lower packet 264 includes N-bit data, and the first BTCU 430 may include N BTCs (BTC31, ..., BTC3$n$). Each of the N BTCs (BTC31, ..., BTC3$n$) may output logic "one" when a toggle occurs in the corresponding bit, and may output logic "zero" when a toggle does not occur in the corresponding bit. The first BTCU 430 counts the number of logic "ones" from the N BTCs (BTC31, ..., BTC3$n$), and provides the number of logic "ones" as the first output to the comparator 450.

Figure 7B:
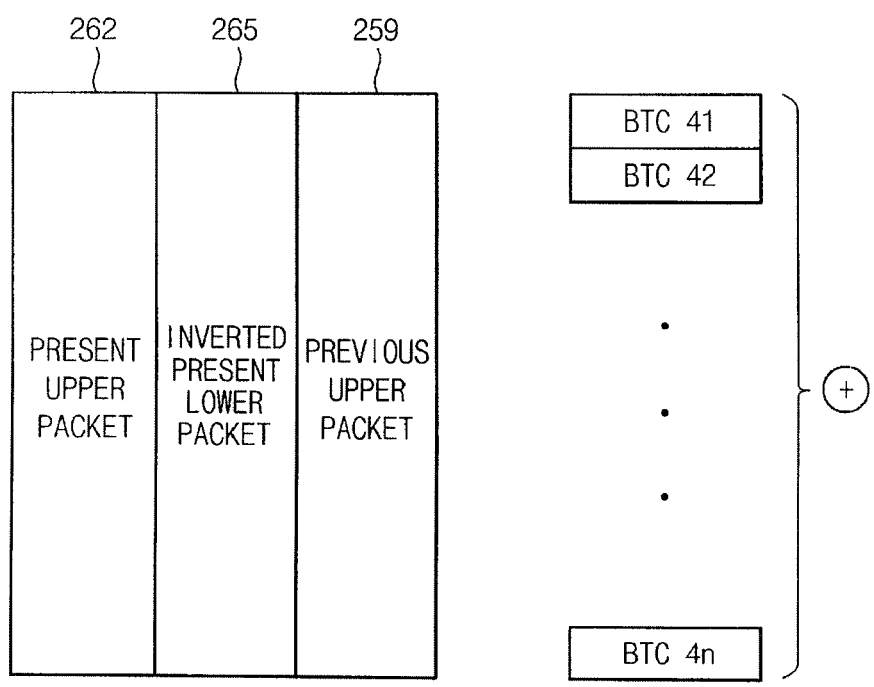
FIG. 7B illustrates exemplary operation of a second BTCU of the DRI device.

FIG. 7B illustrates an operation of the second BTCU 440 in case of the DRI device.

Referring to FIG. 7B, the second BTCU 440 counts the second toggle number of toggling bits in the previous upper packet 259, the inverted present lower packet 265 and the present upper packet 262 to provide the second output to the comparator 450. The second BTCU 440 may include N BTCs (BTC41, ..., BTC4$n$). Each of the N BTCs (BTC41, ..., BTC4$n$) may output logic "one" when a toggle occurs in the corresponding bit, and may output logic "zero" when a toggle does not occur in the corresponding bit. The second BTCU 440 counts the number of logic "ones" from the N BTCs (BTC41, ..., BTC4$n$), and provides the number of logic "ones" as the second output to the comparator 450.

The comparator 450 compares the first output from the first BTCU 430 and the second output from the second BTCU 440 to provide the state of the reverse bit. When the first output is equal to or greater than the second output, the reverse bit may correspond to logic "one". When the first output is smaller than the second output, the reverse bit may correspond to logic "zero". Alternatively, when the first output is equal to or greater than the second output, the reverse bit may correspond to logic "zero," and when the first output is smaller than the second output, the reverse bit may correspond to logic "one."

That is, the comparator 450 provides the reverse bit to indicate whether the present lower packet is inverted, based on the toggle number of each bit of the previous upper packet, the present lower packet and the present upper packet.

The TPGU 220 receives the present upper packet, the present lower packet and the reverse bit to provide a transmission packet including the reverse bit. The transmission packet may include the present lower packet or the inverted present lower packet according to the reverse bit.

Figure 8:
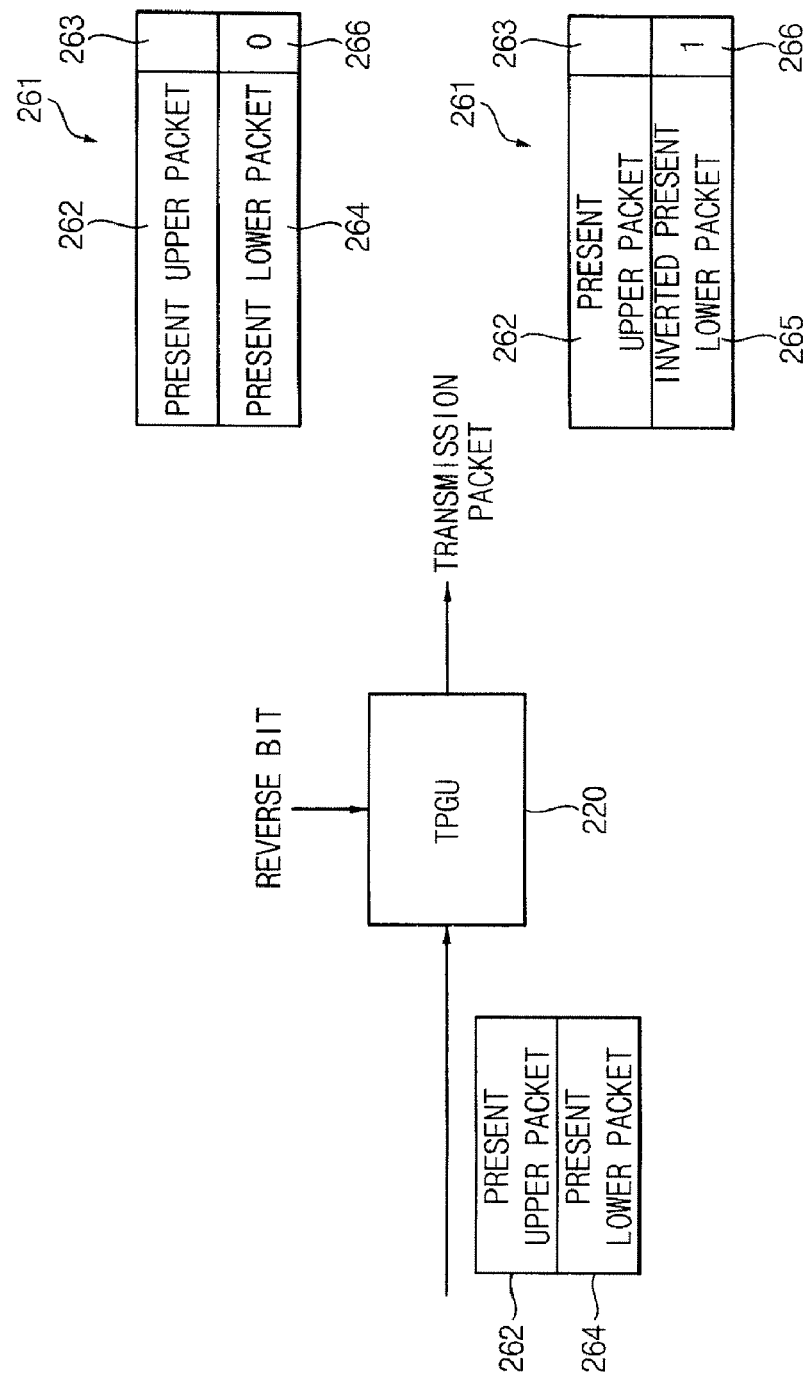
FIG. 8 illustrates exemplary operation of a TPGU of the DRI device.

FIG. 8 illustrates an operation of the TPGU 220 of the DRI device.

Referring to FIG. 8, the TPGU 220 receives the present upper packet 262 and the present lower packet 264 from the PGU 200 and the reverse bit from the RBGU 210. The reverse bit 266 may be appended to the last bit of the present lower packet 264, and the inverted present lower packet 265. The extra bit 263 may be appended to the present upper packet 263. When the reverse bit corresponds to logic "zero," the TPGU 220 provides a packet 261 including the present upper packet 262, an extra bit 263, the present lower bit 264 and the reverse bit 266 corresponding to logic "zero" as the transmission packet. When the reverse bit corresponds to logic "one," the TPGU 220 provides a packet 261 including the present upper packet 262, an extra bit 263, the inverted present lower bit 265 and the reverse bit 266 corresponding to logic "one" as the transmission packet. That is, the TPGU 220 provides a packet having the smaller toggle number based on the reverse bit 266. Therefore, power consumption may be reduced.

Referring back to FIG. 1, the PRU 230 recovers the present upper packet 262 and the present lower packet 264 from the transmission packet 261 according to the value of the reverse bit 266 included in the transmission packet 261. When the reverse bit 266 corresponds to logic "zero," the PRU 230 removes the extra bit 263 and the reverse bit 266 from the transmission packet 261, and provides the present upper packet 262 and the present lower packet 264 to the DRU 240. When the reverse bit 266 corresponds to logic "one," the PRU 230 removes the extra bit 263 and the reverse bit 266 from the transmission packet 261, inverts the inverted present lower packet 265 and provides the present upper packet 262 and the present lower packet 264 to the DRU 240. The DRU 240 recovers the data from the present upper packet 262 and the present lower packet 264.

In the exemplary embodiments of the present general inventive concept, there have been descriptions about the SRI device that the reverse bit is included in one packet and a packet having the smaller toggle number is transmitted, and the DRI device one packet is segmented into the upper packet and the lower packet, the reverse bit is included in the lower packet, and the a packet having the smaller toggle number is transmitted. However, it will be apparent to those skilled in the art that the upper packet may be inverted instead of the lower packet, or both of the upper packet and the lower packet may be inverted.

The DRI device according to an example embodiment of the present general inventive concept may manage the toggle rate to be under 50% in the worst case, because one of the present lower packet and the inverted present lower packet is selected and transmitted when the data are transmitted from the first chip to the second chip.

In a method of dual rate interfacing, data that are to be transmitted from a first chip to a second chip are transformed to a present upper packet 262 and a present lower packet 264. The present upper packet 262 and the present lower packet 264 are simultaneously provided during one clock cycle. A reverse bit 266 is provided based on a toggling number of state changes at each corresponding bit position of the present upper packet 262, the present lower packet 264 and a previous lower packet 259. The reverse bit 266 indicates whether the present lower packet 264 is inverted. The present upper packet 262, the present lower packet 264 and the reverse bit are assembled into a transmission packet 261 including the reverse bit 266. The transmission packet 261 may include the present lower packet 264 or the inverted present lower packet 265 according to the state of the reverse bit 266. The present upper packet 262 and the present lower packet 264 are recovered from the transmission packet 261. The data are recovered from the present upper packet 262 and the present lower packet 264. Further description about the method of dual rate interfacing is similar with the detailed description about the DRI device, and will be omitted.

Figure 9:
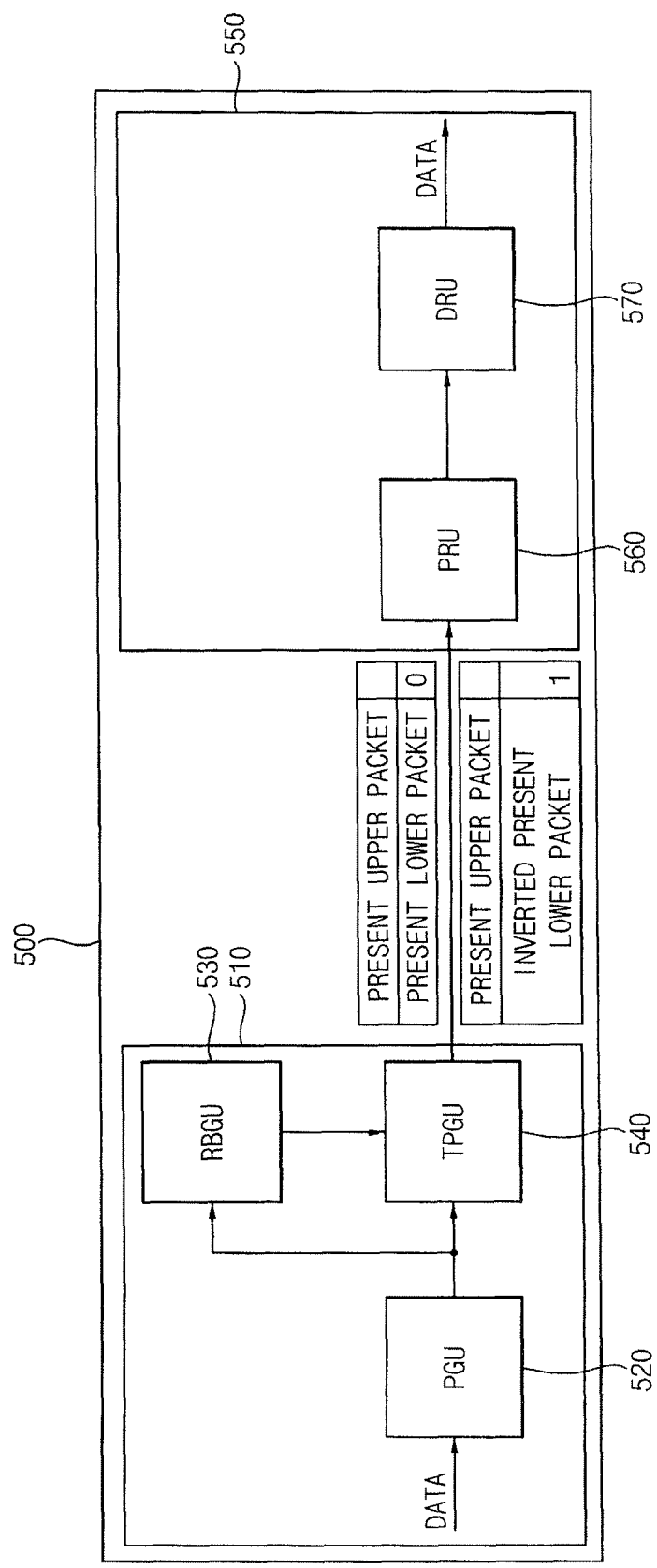
FIG. 9 is a block diagram illustrating a system in package according to an exemplary embodiment of the present general inventive concept.

FIG. 9 is a block diagram illustrating a system in package (SIP) according to an exemplary embodiment of the present general inventive concept.

Referring to FIG. 9, the exemplary SIP includes a package substrate 500, a first chip 510 mounted on the package substrate 500, and a second chip 550 mounted on the package substrate 500. The second chip 550 exchanges packetized data with the first chip 510.

The first chip 510 includes a PGU 520, a RBGU 530, and a TPGU 540. The PGU 520 transforms data to a present upper packet and a present lower packet and simultaneously provides the present upper packet and a present lower packet during one clock cycle. The RGBU 530 provides the reverse bit to indicate whether the present lower packet is inverted based on the toggle number of each bit of the present upper packet, the present lower packet and the previous upper packet. The TPGU 540 receives the present upper packet, the present lower packet, and the reverse bit to provide a transmission packet that includes the reverse bit, the present upper packet and one of the present lower packet and the inverted present lower packet. The data are transmitted from the first chip 510 to the second chip 550.

The second chip 550 includes a PRU 560 and a DRU 570. The PRU 560 recovers the present upper packet and the present lower packet based on the reverse bit included in the transmission packet. The DRU 570 recovers the data that are transmitted from the first chip 510 to the second chip 550 from the present upper packet and the present lower packet.

The detailed architecture and description of the PGU 520, the RBGU 530, the TPGU 540, the PRU 560, and the DRU 570 in FIG. 9 may be similar to FIGS. 1, 2B, 6, 7A, 7B, and 8, and thus, further detailed description will be omitted.

As mentioned above, the SRI device, the DRI device and the SIP according to example embodiments of the present general inventive concept invert a packet, compare the toggle number state changes of each bit, and transmit a packet having the smaller toggle number. Therefore, the toggle rate may be controlled below 50%, because one of a first packet that is not inverted and a second packet that is inverted is selected and transmitted. Accordingly, power consumption is reduced and the number of power pins may also be reduced accordingly.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An interface device comprising:
a packet generation unit (PGU) that transforms data to a present packet, the data being transmitted from a first chip to a second chip;
a reverse bit generation unit (RBGU) that provides a reverse bit to indicate whether the present packet is inverted, based on a toggle number of each bit in the present packet with respect to a previous packet, the previous packet corresponding to a packet that is transmitted prior to the present packet;
a transmission packet generation unit (TPGU) that receives the present packet and the reverse bit to provide a transmission packet including the reverse bit and one of the present packet and an inverted present packet, the inverted present packet is a packet that the present packet is inverted;
a packet recovery unit (PRU) that recovers the present packet from the transmission packet, based on the reverse bit; and
a data recovery unit (DRU) that recovers the data from the present packet,
wherein the RBGU comprises:
a register that stores the previous packet;
a first bit toggle checker unit (BTCU) that counts a first toggle number of toggling bits in the present packet with respect to the previous packet;
a second BTCU that counts a second toggle number of toggling bits in the inverted present packet with respect to the previous packet; and
a comparator that compares a first output of the first BTCU and a second output of the second BTCU to provide the reverse bit.

2. The interface device of claim 1, wherein the RBGU further comprises a bit reverse unit (BRU) that inverts each bit of the present packet.

3. The interface device of claim 2, wherein the TPGU provides the transmission packet including the reverse bit and the inverted present packet when the reverse bit indicates that the first output is equal to or greater than the second output and wherein the TPGU provides the transmission packet including the reverse bit and the present packet when the reverse bit indicates that the first output is smaller than the second output.

4. The interface device of claim 3, wherein the PRU removes the reverse bit from the transmission packet, inverts the inverted present packet, and provides the present packet to the DRU when the reverse bit indicates that the first output is equal to or greater than the second output and wherein the PRU removes the reverse bit from the transmission packet, and provides the present packet to the DRU when the reverse bit indicates that the first output is smaller than the second output.

5. An interface device comprising:
a packet generation unit (PGU) that transforms data to a present upper packet and a present lower packet and simultaneously provides the present upper packet and the present lower packet during one clock cycle, the data to be transmitted from a first chip to a second chip;
a reverse bit generation unit (RBGU) that provides a reverse bit to indicate whether the present lower packet is inverted, based on a toggle number of bits at each corresponding bit position of the present upper packet, the present lower packet and a previous upper packet, the previous upper packet corresponding to a packet that is transmitted prior to the present upper packet and the present lower packet;
a transmission packet generation unit (TPGU) that receives the present upper packet, the present lower packet and the reverse bit to provide a transmission packet including the reverse bit, the present upper packet and one of the present lower packet and an inverted present lower packet, the inverted present lower packer corresponding to a packer that the present lower packet is inverted;
a packet recovery unit (PRU) that recovers the present upper packet and the present lower packet from the transmission packet, based on the reverse bit; and
a data recovery unit (DRU) that recovers the data from the present upper packet and the present lower packet,
wherein the RBGU comprises:
a register that stores the previous upper packet;
a first bit toggle checker unit (BTCU) that counts a first toggle number of state changes at each corresponding bit position of the previous upper packet, the present lower packet and the present upper packet;
a second BTCU that counts a second toggle number of state changes at each corresponding bit position of the previous upper packet, the inverted present lower packet and the present upper packet; and
a comparator that compares a first output of the first BTCU and a second output of the second BTCU to provide the reverse bit.

6. The interface device of claim 5, wherein the RBGU further comprises a bit reverse unit (BRU) that inverts each bit of the present lower packet.

7. The interface device of claim 6, wherein the TPGU provides the transmission packet including the reverse bit, the present upper packet, and the inverted present lower packet during the one clock cycle when the reverse bit indicates that the first output is equal to or greater than the second output and wherein the TPGU provides the transmission packet including the reverse bit, the present upper packet, and the present lower packet during the one clock cycle when the reverse bit indicates that the first output is smaller than the second output.

8. The interface device of claim 7, wherein the reverse bit is appended to a last bit of the inverted present lower packet, and an extra bit is appended to a last bit of the present upper packet to compensate a bit length of present upper packet to the bit length of the present lower packet.

9. The interface device of claim 8, wherein the PRU removes the reverse bit and the extra bit from the transmission packet, inverts the inverted present lower packet, and provides the present upper packet and the present lower packet to the DRU when the reverse bit indicates that the first output is equal to or greater than the second output and wherein the PRU removes the reverse bit and the extra bit from the transmission packet, and provides the present upper packet and the present lower packet to the DRU when the reverse bit indicates that the first output is smaller than the second output.

* * * * *